United States Patent [19]

Olson

[11] 4,028,173

[45] June 7, 1977

[54] METHODS OF MAKING COMBINED TITANIUM DIOXIDE AND CALCIUM CARBONATE AND OPAQUE PAPER CONTAINING THE RESULTING COMBINATION

[75] Inventor: Robert A. Olson, York New Salem, Pa.

[73] Assignee: P. H. Glatfelter Co., Spring Grove, Pa.

[22] Filed: Aug. 15, 1975

[21] Appl. No.: 605,216

[52] U.S. Cl. .......................... 162/181 A; 106/300; 106/306; 162/181 B; 162/183
[51] Int. Cl.² ............................................ D21D 3/00
[58] Field of Search ........... 162/181 A, 181 B, 183; 106/306, 300

[56] References Cited

UNITED STATES PATENTS 3,546,066  12/1970  Ware et al. .................... 162/181 B

OTHER PUBLICATIONS

Casey, "Pulp & Paper," (1960), vol. II, p. 947.

*Primary Examiner*—S. Leon Bashore
*Assistant Examiner*—Peter Chin
*Attorney, Agent, or Firm*—Fisher, Christen & Sabol

[57] ABSTRACT

Method of making $TiO_2$—$CaCO_3$ combinations without involving a chemical reaction, said combinations, containing up to 50% $CaCO_3$ in the combination, having the same scattering coefficient in paper as 100% $TiO_2$ and method of making opaque paper containing the resulting combination.

9 Claims, 2 Drawing Figures

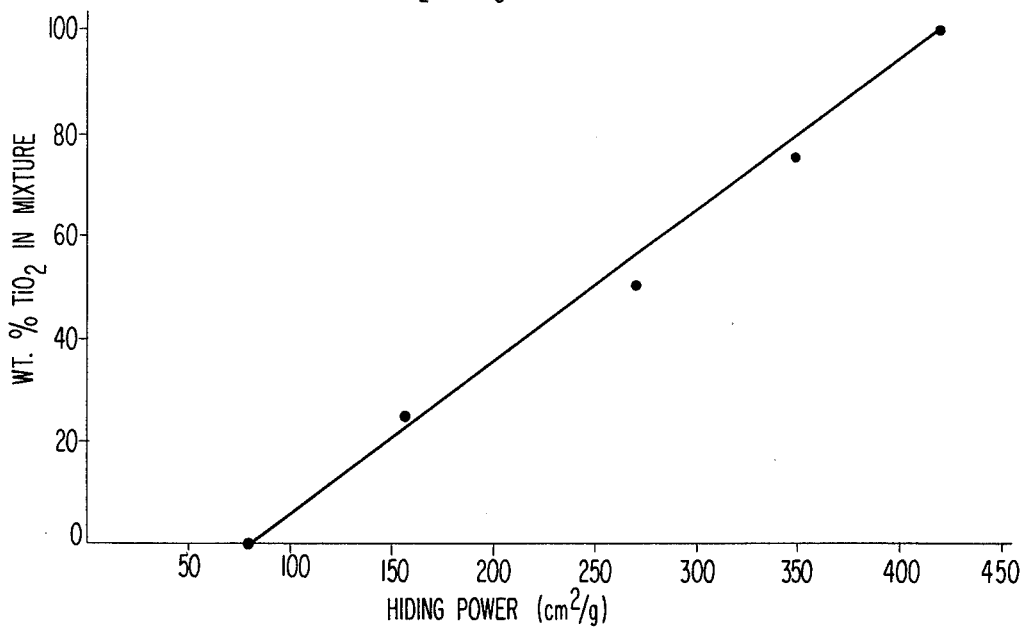
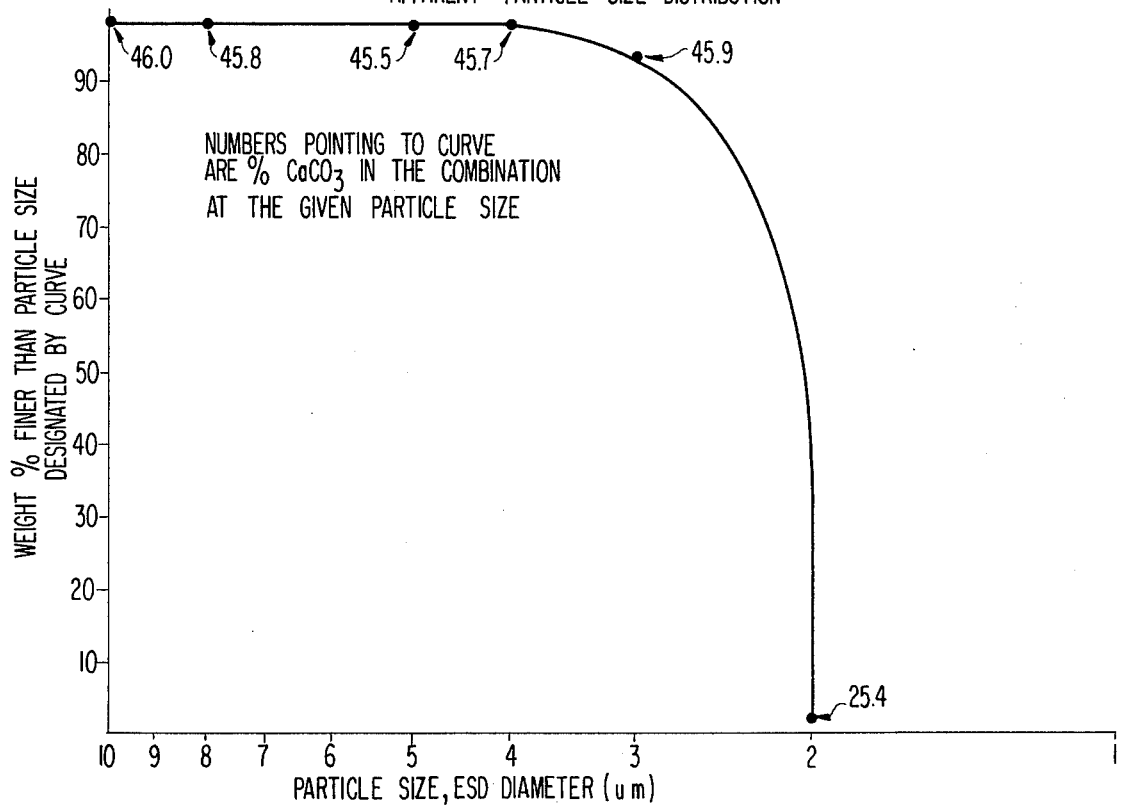

METHODS OF MAKING COMBINED TITANIUM DIOXIDE AND CALCIUM CARBONATE AND OPAQUE PAPER CONTAINING THE RESULTING COMBINATION

SUMMARY OF THE INVENTION

This invention relates to the manufacture of composite pigments of $TiO_2$ and $CaCO_3$ and the use of such composite pigments in the manufacture of papers. The invention is based on the unexpected discovery that composite pigments made by mixing a slurry consisting essentially of $TiO_2$ with a slurry consisting essentially of $CaCO_3$ have higher scattering coefficients (opacifying powers) than the proportionate sum of the separate components, $TiO_2$ and $CaCO_3$. In particular, composite pigments made pursuant to this invention containing up to 50 wt.% $CaCO_3$ have essentially the same scattering coefficient (opacifying power) as 100 wt.% $TiO_2$. The invention also relates to the use of said composite pigments in the manufacture of opaque papers.

BACKGROUND OF THE INVENTION

In the manufacture of papers, pigments and other agents are customarily metered into the paper pulp separately rather than mixing them prior to addition to the pulp. This not only eliminated the need for extra mixing equipment and additional work but also permitted far more versatility in the amounts of pigments or other agents added as compared to making up the mixture first. However, certain advantages are available by first preparing mixture of pigments such as a composite pigment of titanium dioxide and calcium carbonate, prior to adding same to the pulp.

Many composite pigments have been described in the art and the majority of these involve $TiO_2$ as one of the components because of its superior opacifying power. Moreover, because of the relatively high cost of $TiO_2$, there is considerable interest in forming such composites, or in extending the $TiO_2$, with relatively low cost materials such as calcium sulfate, calcium carbonate, or sodium aluminum silicates, for example. The present invention is concerned with combinations of $TiO_2$ and $CaCO_3$ for use as opacifying agents in paper, and differs from composite pigments described in the prior art in that they are easier and simpler to prepare and in that no chemical reaction is involved in their preparation.

One method of the prior art is described in U.S. Pat. No. 2,170,800 wherein a mixture of $TiO_2$ and $CaSO_4$ is reacted with a solution of $Na_2CO_3$ to convert the $CaSO_4$ to $CaCO_3$ and precipitate a composite pigment comprised of $TiO_2$ and $CaCO_3$.

Another method for producing a $TiO_2$—$CaCO_3$ composite pigment is described in U.S. Pat. No. 3,528,838 in which a solution of $Na_2CO_3$ and a solution of $CaCL_2$ are employed. Pigmentary $TiO_2$ is dispersed in one of these solutions and the two solutions are mixed to precipitate a $TiO_2$—$CaCO_3$ composite pigment.

Still another coalesced composite pigment is described in U.S. Pat. No. 3,832,206 wherein pigmentary $TiO_2$ is dispersed in a solution of $Na_2CO_3$. A slurry of $Ca(OH)_2$ is added to the $Na_2CO_3$—$TiO_2$ mixture in order to react with the $Na_2CO_3$ and precipitate $CaCO_3$. The $CaCO_3$ formed in the presence of the $TiO_2$ pigment particles results in a coalesced composite pigment of $TiO_2$—$CaCO_3$.

In each of the three processes referred to above, the composite pigment product before it can be used in paper making, must be separated from the aqueous phase in which it is formed and washed free of the by-product resulting from the chemical reaction involved in producing $CaCO_3$ This would be $Na_2SO_4$ in case of U.S. Pat. No. 2,170,800, NaCl in the case of U.S. Pat. No. 3,528,838, and NaOH in the case of U.S. Pat. No. 3,832,206.

In the present invention, since no chemical reaction is involved, there is no by-product which must be separated from the $TiO_2$—$CaCO_3$ combination by washing or otherwise. This results in important simplifications of the process, the elimination of costly equipment, such as a vacuum filter, and the elimination of waste water disposal problems. It also eliminates the risk of unreliable performance caused by the greater likelihood of impurities in the composite pigment.

In order to demonstrate the process of this invention, it is necessary to utilize a quantitative means for expressing and comparing the opacifying power of paper fillers. This can be done accurately and precisely by using a measurement called the "scattering coefficient, $s$," derived from the theory of light scattering developed by Kubelka and Munk and published in 1931, Z. Tech. Physik 12:539 (1931). Application of the Kubelka-Munk Theory to papers did not come until much after 1931, but is now the common means used by the paper industry to evaluate the opacifying power of fillers. There are a number of excellent discussions of the use of scattering coefficient measurements in paper applications such as W. J. Hillend, Tappi, 49:41A (July 1966) and G. A. Hemstock, Tappi, 45:158A (February, 1962).

Table 1 below gives the scattering coefficients, s, for precipitated $CaCO_3$, and the two forms of $TiO_2$ in paper. The higher the value of $s$, the greater the opacifying power of the filler or pigment. It is well recognized that rutile $TiO_2$ has even more opacifying power than anatase, but it is also more expensive and is used but little in papers. A range in values is given because there are a number of different commercial products of each filler type and these can have different scattering coefficients depending upon particle size distribution, surface treatments on the particles, etc. Also, for any given product, different values for the scattering coefficient in paper can be obtained as a result of experimental errors or differences in the modes of incorporating the fillers in paper. However, a skilled technician following a set procedure can obtain replicate values with a given product which agree within 100 to 200 units.

TABLE 1

| | Scattering Coefficients In Paper | |
|---|---|---|
| Filler | $s$ cm$^2$/g | Identification |
| ppt. CaCO$_3$ | 2000–2400 | Purecal-O, BASF Wyandotte or Albaglos, Pfizer, Inc. |
| anatase TiO$_2$ | 4000–4700 | Titanox AWD 1010, N. L. Industries, Inc. or A-410, New Jersey Zinc Co. |
| rutile TiO$_2$ | 5500–7500 | Titanox RA 42, N. L. Industries, Inc. |

DESCRIPTION OF THE DRAWINGS

The present invention is described hereinafter and reference is made to the drawings in which:

FIG. 1 is a plot of Hiding Power (CM²/g) as determined by a Pfund Cryptometer of $TiO_2$—$CaCO_3$ mixtures suspended in water versus weight percent of $TiO_2$ in said mixtures.

FIG. 2 is a plot of particle size distribution of combinations of $TiO_2$ and $CaCO_3$. The data reflected by FIG. 2. were obtained by the usual gravity sedimentation method from aqueous slurries of these combined pigments.

DETAILED DESCRIPTION OF THE INVENTION

In the present invention, I have found that by co-mixing slurries of $TiO_2$ and $CaCO_3$, $TiO_2$—$CaCO_3$ combinations or complexes result which, up to about 50% $CaCO_3$ in the combination, have essentially the same scattering coefficient in paper as does 100% $TiO_2$. This is a discovery of considerable value in the manufacture of high opacity papers since use of these conbinations affords significant reductions in $TiO_2$ requirements, and $TiO_2$ is easily the most costly filler used in papers. Moreover, the process of this invention is, unlike prior art cited which requires bothersome filtration and washing steps, very simple and can be done routinely by a paper mill as part of its normal operation since it requires nothing more than a tank and mixer with which to combine the two slurries prior to adding to the paper furnish.

The values given in Table 2 for scattering coefficient in paper are the averages from Table 3, Example 1, illustrating that up to about 50% $CaCO_3$ in $TiO_2$—$CaCO_3$ combinations according to the present invention, the scattering coefficients in paper are essentially the same as for 100% $TiO_2$.

Table 2

Scattering Coefficients in Paper
$TiO_2$-$CaCO_3$ Combinations

| Components of Combination | | s |
|---|---|---|
| $TiO_2$* | $CaCO_3$** | cm²/g |
| 100% | 0 | 4450 |
| 67% | 33% | 4380 |
| 50% | 50% | 4190 |

*A-410
**Albaglos

Statistical analysis of the data in Table 3 shows that there is no significant difference among the three average values in Table 2. However, one would predict that the scattering coefficient of a 50:50 mixture would be much lower than 4190, indeed that it would be the average of 4450 (100% $TiO_2$) and 2200 (100% $CaCO_3$), or 3325. As shown in FIG. 1, this is exactly what is observed in water suspension of $TiO_2$ and $CaCO_3$ as determined by another common measure of opacifying power, called Hiding Power, used routinely in the paint and coatings industries. In FIG. 1 the values for the Hiding Powers of $TiO_2$—$CaCO_3$ mixtures suspended in water as measured by a Pfund Cryptometer (using the method described in Proceeding ASTM, ASTEA, Vol. 30, Part II, 1930, p. 878, by Pfund, A. H. "Measurements In Theory And Application") are almost exactly what would be calculated from the composition of the mixtures. However, when the $TiO_2$—$CaCO_3$ combinations are laid down in paper according to this invention, I have found that, with up to about 50% $CaCO_3$ in the combination, the opacifying power or scattering coefficients are essentially the same as those provided by 100% $TiO_2$. This was not to be expected. Furthermore, there is not unexpectedly high opacifying power (scatteing coefficients) obtained in paper when $TiO_2$ and $CaCO_3$ are separately added to the paper furnish. The following explanation is advanced to explain the unexpectedly high opacifying power (scattering coefficients) found in paper as a result of this invention.

$TiO_2$ particles and cellulose fibers both carry a negative electrostatic charge when dispersed in water. When $TiO_2$ is added to a fiber furnish and then, as is normal paper making procedure, a cationic retention aid is added, the charge characteristics of the system change and $TiO_2$ particles will not only deposit on the fibers but they will agglomerate on each other. The agglomerates are significantly less effective as opacifying agents than the individual $TiO_2$ particles.

Particles of $CaCO_3$ are essentially neutral in charge and therefore appear relatively positive to the highly negative $TiO_2$ particles. Hence, if $TiO_2$ and $CaCO_3$ slurries are co-mixed, it is hypothesized that the $TiO_2$ particles attach themselves to the relatively positive $CaCO_3$ particles. If such a $TiO_2$—$CaCO_3$ combination is added to a fiber furnish and the cationic retention aid is then added, the $TiO_2$ particles are now no longer free to floc onto each other and there will be little or no formation of $TiO_2$ agglomerates with attendant loss in opacifying power.

To test the hypothesis that a $TiO_2$—$CaCO_3$ combination or complex is being formed rather than a mixture, a determination of particle size distribution was run on a nominal 50:50 $TiO_2$—$CaCO_3$ (54:46 by actual analysis) combination formed by the process of this invention using a gravity sedimentation procedure. At each appropriate settling time, a small sample corresponding to the particle sizes shown in FIG. 2 was removed to analyze for $TiO_2$ and $CaCO_3$. The $TiO_2$ used had an average particle size of 0.3 um as mean diameter. The $CaCO_3$ used was coarser than the $TiO_2$ but still quite fine, 70% was < 2 um and 30% < 1 um. In a mixture, it would be expected that the two components, because of the differences in particle size, would have a significant tendency to separate during settling, the finer particles remaining in suspension and the coarser particles settling more rapidly. In such a case, one would expect the % $CaCO_3$ to be high in the coarse particle fractions and become progressively lower in the finer particle fractions as settling continued. As shown in FIG. 2, this did not occur, the $TiO_2$ and $CaCO_3$ settled together.

There is another highly distinctive feature to the particle size distribution curve shown in FIG. 2. Essentially all the settling particles are in a very narrow size range, 2 um to 3 um, and this is a much larger particle size than would be found for either the $TiO_2$ or $CaCO_3$ in a simple mixture of the two components. This can readily be pictured as resulting from $TiO_2$ particles being electrostatically held on and strongly bound to the $CaCO_3$ particles as explained above. Furthermore, the very small fraction, 1% by weight, which is under 2um is high in $TiO_2$, as would be predicted. Also, the low level of material remaining below the 2um to 3um range of the combination probably explains why the scattering coefficient begins to fall sharply when more than 50% $CaCO_3$ is present in the combination. At about 50% $CaCO_3$, essentially all the $TiO_2$ by weight is already attached to $CaCO_3$ and any additional $CaCO_3$ particles will act as $CaCO_3$ and not in the desired combination.

In a preferred embodiment of this invention, the CaCO$_3$ slurry at about 20% solids will be added with constant gentle mixing to a TiO$_2$ slurry at 50% to 70% solids and the gentle mixing continued for about 30 minutes to provide ample time to form the TiO$_2$—CaCO$_3$ combination. Lengthy mixing is not detrimental. Vigorous mixing can be used to reduce the time needed for the TiO$_2$—CaCO$_3$ combinations to form. The solids concentration of the slurries is not critical for the purpose of this invention. The solids content should not be so high that the resulting high viscosity prevents ready mixing; at exceedingly low solids an expensively higher capacity mixing tank is required. As a general guide, a slurry of about 15 to about 70% solids TiO$_2$ and a slurry of about 15 to about 30% solids CaCO$_3$ can be used. Also, the manner of co-mixing the two slurries is not critical. I have obtained the same results by adding TiO$_2$ to CaCO$_3$ and also by simultaneously introducing the two slurries into the mixing tank. It is essential, however, that the slurries be free of materials or agents that would ionically interfere with the formation of the TiO$_2$—CaCO$_3$ combinations. Highly ionic materials are to be kept out of the slurries so as not to interfere with ionic interaction of TiO$_2$ and CaCO$_3$. It is for this reason that the term "consisting essentially of" is used in the claims, i.e., to exclude from said slurries all materials that would interfere with and prevent the information of the TiO$_2$—CaCO$_3$ combinations.

Extended storage times under mild agitation, to prevent settling, do not have a deleterious effect on the TiO$_2$—CaCO$_3$ combination. Hence, one tank of adequate size can serve both as a mixing tank and a storage tank.

Normally in practice there are many different grades of paper made requiring a range of pigment content, from about 1% to 25% by weight on a dry basis. When titanium dioxide is added to paper, it may account for about 1% to 10% or more of the weight of the paper depending on how large an improvement in opacity is desired. Therefore, it may not always be practical to use the prefered 50-50 TiO$_2$—CaCO$_3$ combined product of this invention to obtain the desired percentage of TiO$_2$ and other filler in a given grade. For example, if the total pigment in a paper is desired to be 15%, because of weight and body considerations, but the TiO$_2$—CaCO$_3$ combined product needed to produce the desired opacity is only 10% can be made up with calcim carbonate added separately to the pulp or added while making the TiO$_2$—CaCO$_3$ combined product in which case a 33-67 product would result. While this 33-67 TiO$_2$—CaCO$_3$ combined product would not have an s value equal to TiO$_2$ alone on a pound-for-pound basis, the benefit of making the combined product would not be lost and the additional portion of calcium carbonate would have its normal s value. Should there be some reason to restrict the amount of calcium carbonate in the paper, a higher ratio of TiO$_2$ to CaCO$_3$ in the combined product can be used to economic advantage even though the full economic benefit of the 50-50 ratio is not accomplished. For example, amounts of as little as 10 weight percent CaCO$_3$ and 90 weight percent TiO$_2$ provide advantages and are included in this invention. Thus, in illustration of this invention, the amount of CaCO$_3$ can range from 10 to 50 weight percent, preferably 20 to 50 weight percent, and the TiO$_2$ can range from 50 to 90 weight percent, preferably 50 to 80 weight percent on a dry weight basis. Amounts above and below these ranges can be used, however.

It is recognized, that the preferred embodiment of this invention utilizes fine particle size CaCO$_3$ as in the examples. However, the concept of this invention of avoiding TiO$_2$ self-agglomeration by the addition of CaCO$_3$ will apply to some degree even when coarser particle size CaCO$_3$ is utilized, but a lower s value of the resulting combined pigment can be expected. The average particle size range for the TiO$_2$ can extend from 0.1 to 1.5 um (ESD) and that of the CaCO$_3$ can extend from 0.3 to 2um (ESD).

The following examples are presented in which all parts and percentages are on a weight basis.

EXAMPLE 1

Laboratory handsheets were prepared according to Tappi Standard Method T205 os-71 to compare the scattering coefficients in the paper of 100% TiO$_2$, 67:33 TiO$_2$:CaCO$_3$ combinations, and 50:50 combinations. The data are given in Table 3. Both Bausch and Lomb (B & L) and GE brightnesses are given; B & L brightness was used to determine the scattering coefficients, GE brightness is commonly used to describe the reflectance of paper. The opacity values were determined pursuant to TAPPI Test Method T425m-60 (opacity values are ratios) and are all corrected to 65 g/m$^2$ basis weight. The scattering coefficient of the pulp used was 305 cm$^2$/g.

A paper furnish was prepared containing about 70 weight percent fully bleached hardwood pulp and 30 weight percent bleached pine pulp. The furnish was refined to a Canadian standard freeness of about 400. The TiO$_2$-CaCO$_3$ combinations were prepared by adding to an aqueous slurry of paper grade anatase TiO$_2$ (A-410 —average particle size of about 0.3 um) at 25% solids a 20% slurry of precipitated CaCO$_3$ (Albaglos —average particle size of 1um). The mixed slurries were stirred for 30 minutes with a magnetic stirrer at a speed just sufficient to produce a vortex and then added to the furnish. A cationic (Cato cornstarch, National Starch & Chemical Corporation) then was added to the sheet mold as a retention aid, in the proportion of 8 lb. per ton of paper.

TABLE 3

| Pigment or Filler (Wt. basis) | Opacity | Brightness B & L | GE | s of Paper | % Total Pigment or Filler | s (cm$^2$/g) of Total Filler or Pigment in Paper |
|---|---|---|---|---|---|---|
| 100% TiO$_2$ | 87.1 | 88.0 | 83.4 | 555 | 5.6 | 4700 |
| 100% TiO$_2$ | 86.2 | 87.5 | 83.0 | 520 | 5.9 | 4190 |
| TiO$_2$:CaCO$_3$ combination 2:1 | 85.8 | 87.5 | 82.6 | 510 | 5.2 | 4330 |
| TiO$_2$:CaCO$_3$ combination 2:1 | 86.0 | 87.5 | 82.9 | 515 | 5.1 | 4460 |
| TiO$_2$:CaCO$_3$ combination 2:1 | 86.2 | 87.5 | 83.1 | 525 | 5.2 | 4530 |
| TiO$_2$:CaCO$_3$ combination | | | | | | |

TABLE 3-continued

| Pigment or Filler (Wt. basis) | Opacity | Brightness B & L | GE | s of Paper | % Total Pigment or Filler | s (cm²/g) of Total Filler or Pigment in Paper |
|---|---|---|---|---|---|---|
| 2:1 | 86.3 | 87.5 | 82.8 | 525 | 5.7 | 4190 |
| TiO₂:CaCO₃ combination 1:1 | 85.7 | 87.5 | 82.7 | 510 | 5.1 | 4330 |
| TiO₂:CaCO₃ combination 1:1 | 85.1 | 87.5 | 82.6 | 490 | 5.1 | 3990 |
| TiO₂:CaCO₃ combination 1:1 | 86.0 | 87.0 | 82.5 | 510 | 4.9 | 4530 |
| TiO₂:CaCO₃ combination 1:1 | 85.3 | 87.5 | 82.3 | 495 | 5.3 | 3920 |
| TiO₂ + CaCO₃ added separately 2:1 | 86.0 | 88 | 84.2 | 525 | 8.3 | 3040 |
| TiO₂ + CaCO₃ added separately 1:1 | 85.0 | 87.5 | 83.0 | 490 | 7.7 | 2840 |

EXAMPLE 2

Paper Machine Data

The data in Table 4 were taken from a Fourdrinier paper machine run comparing $TiO_2$—$CaCO_3$ combinations with uncombined $TiO_2$. In all cases, the paper being made was a high opacity paper, basis weight being equal to 90 g/m². Opacity values were determined as decribed in Example 1. The scattering coefficient of the pulp was 370 cm²/g. The paper furnish used was made to contain about 60 wt.% of fully bleached hardwood pulp and about 40 wt.% of a fully bleached pine pulp. The furnish was refined to a Canadian standard freeness of 400. The $TiO_2$ or $TiO_2$—$CaCO_3$ combinations as the case may be were added to the furnish. A high molecular weight cationic polymer was thereafter used on the machine as a retention aid in the amount of 0.4 lb./per ton of paper.

The $TiO_2$—$CaCO_3$ combinations were prepared by adding a 20% slurry of precipitated $CaCO_3$ (Purecal-O — ave. part. size of about 1um) to a 50% slurry of paper grade anatase $TiO_2$ (AWD 1010 — particle size of about 0.3um). The combinations were separately subjected to gentle agitation for 60 minutes before using. Two different $TiO_2$—$CaCO_3$ combinations were prepared and found by chemical analysis to be 60:40 and 55:45 $TiO_2:CaCO_3$, respectively.

The commercial paper made on the paper machine Example 2 was a part of a regular production run in the mill and the situation was not as simple as in the handsheet study in Example 1. In addition to the $TiO_2$—$CaCO_3$ combination or uncombined $TiO_2$, additional $CaCO_3$ was introduced as a separate slurry in each case in amounts sufficient to provide the % Total Filler or Pigment in Paper as given in Table 4 for each case. However, the furnish to which each of the $TiO_2$ and $TiO_2:CaCO_3$ combination pigments or fillers of Example or (Table 4) was added was essentially the same. These runs were made sequentially and the furnish composition did not significantly change over the period the runs were made. It is clear from the data in Table 4 that the use of $TiO_2$—$CaCO_3$ combinations prepared by the process of this invention result in as high opacity and as good scattering coefficients for the paper and for the total filler as uncombined $TiO_2$, but with considerably less $TiO_2$ in the paper.

I claim:

1. In a method of making opaque paper containing pigment wherein said pigment is added to a paper furnish and the resulting mixture is formed into sheets and water is removed, that improvement comprising preparing said pigment by mixing an aqueous slurry consisting essentially of $TiO_2$ with an aqueous slurry consisting essentially of $CaCO_3$ in amounts adequate to provide from 10 to 50 wt. % of $CaCO_3$ based on the total combined dry weight of $TiO_2$ and $CaCO_3$ to form a slurry consisting essentially of a combined $TiO_2$—$CaCO_3$ pigment; adding said combined $TiO_2$ — $CaCO_3$ pigment slurry to said paper furnish and thereafter forming said furnish into sheets and removing water said combined pigment in said paper having essentially the same scattering coefficient as 100% $TiO_2$.

TABLE 4

| | Nature of TiO₂ Added | | | |
|---|---|---|---|---|
| Test Property | Uncombined TiO₂ | 60:40 Combined TiO₂—CaCO₃ | Uncombined TiO₂ | Combined TiO₂—CaCO₃ |
| Brightness, G.E. | 84.1 | 84.7 | 85.5 | 85.6 |
| Opacity | 95.5 | 96.0 | 95.5 | 95.5 |
| s of Paper | 645 | 700 | 695 | 690 |
| % Total Filler in Paper | 17.0 | 18.0 | 18.0 | 18.5 |
| s of Total Filler in Paper | 1895 | 2230 | 2095 | 2095 |
| % TiO₂ in Paper | 6.5 | 5.3 | 6.8 | 4.0 |
| s os TiO₂ alone in paper | 2200 | — | 2745 | — |
| s of TiO₂—CaCO₃ combination alone in Paper | — | 2780 | — | 2620 |

2. Improvement as claimed in claim 1 wherein said combined pigment contains from 20 to 50 wt. % $CaCO_3$ and 80 to 50 wt. % $TiO_2$ on a dry basis.

3. Improvements as claimed in claim 1 wherein said combined pigment contains about 50 wt. % $CaCO_3$ and about 50 wt. % $TiO_2$ on a dry basis.

4. Improvements as claimed in claim 1 wherein said combined pigment contains about 40 wt. % $CaCO_3$ and about 60 wt. % $TiO_2$ on a dry basis.

5. Improvement as claimed in claim 1 wherein said combined pigment contains about 33 wt. % $CaCO_3$ and about 67 wt.% $TiO_2$ on a dry basis.

6. Improvements as claimed in claim 1 wherein the amount of pigment is 1 to 25 wt. % on a dry basis.

7. Improvement as claimed in claim 1 wherein the average particle size of the $TiO_2$ lies in the range of 0.1 to 1.5 um and the average particle size of the $CaCO_3$ lies in the range of 0.3 to 2 um.

8. Improvement as claimed in claim 1 wherein said slurry consisting essentially of $TiO_2$ contains about 15 to about 70% solids $TiO_2$ and the slurry consisting essentially of $CaCO_3$ contains about 15 to about 30% solids $CaCO_3$.

9. Improvement as claimed in claim 1 wherein a cationic agent is added to the paper furnish.

* * * * *